(12) United States Patent
Taguchi

(10) Patent No.: US 9,093,889 B2
(45) Date of Patent: Jul. 28, 2015

(54) MANUFACTURING METHOD FOR LENS DRIVE DEVICE

(75) Inventor: Tadashi Taguchi, Nagano (JP)

(73) Assignee: NIDEC SANKYO CORPORATION (JP)

( * ) Notice: Subject to any disclaimer, the term of this patent is extended or adjusted under 35 U.S.C. 154(b) by 590 days.

(21) Appl. No.: 13/344,805

(22) Filed: Jan. 6, 2012

(65) Prior Publication Data

US 2013/0000115 A1    Jan. 3, 2013

(30) Foreign Application Priority Data

Jan. 6, 2011 (JP) .................. 2011-001133

(51) Int. Cl.
*H02K 41/035* (2006.01)
*H04N 5/225* (2006.01)
*G02B 7/02* (2006.01)
*G02B 7/04* (2006.01)
*G03B 3/10* (2006.01)

(52) U.S. Cl.
CPC ............ *H02K 41/0356* (2013.01); *G02B 7/023* (2013.01); *H04N 5/2254* (2013.01); *H04N 5/2257* (2013.01); *G02B 7/04* (2013.01); *G03B 3/10* (2013.01); *Y10T 29/49144* (2015.01)

(58) Field of Classification Search
CPC ... H02K 41/0356; G02B 7/023; H04N 5/2254
USPC .................................................. 359/696, 824
See application file for complete search history.

(56) References Cited

U.S. PATENT DOCUMENTS

| 2008/0037143 | A1* | 2/2008 | Yoon | 359/824 |
| 2009/0015706 | A1* | 1/2009 | Singh | 348/340 |
| 2010/0033036 | A1* | 2/2010 | Ortt et al. | 310/50 |

FOREIGN PATENT DOCUMENTS

JP    2009-198948 A    9/2009

* cited by examiner

*Primary Examiner* — Livius R Cazan
(74) *Attorney, Agent, or Firm* — Cantor Colburn LLP

(57) ABSTRACT

A manufacturing method for a lens drive device provided with a lens drive module having a movable body, a fixed body and a drive mechanism for driving the movable body, and a circuit board on which the lens drive module is mounted may include a module assembling step in which the lens drive module is assembled, a module mounting step in which the lens drive module is soldered by a reflow method after the module assembling step to be mounted on the circuit board, and a magnetizing step in which a drive magnet of the drive mechanism is magnetized after the module mounting step so that a magnetic pole of one end face and a magnetic pole of the other end face in the optical axis direction are different from each other.

2 Claims, 10 Drawing Sheets

Fig. 9
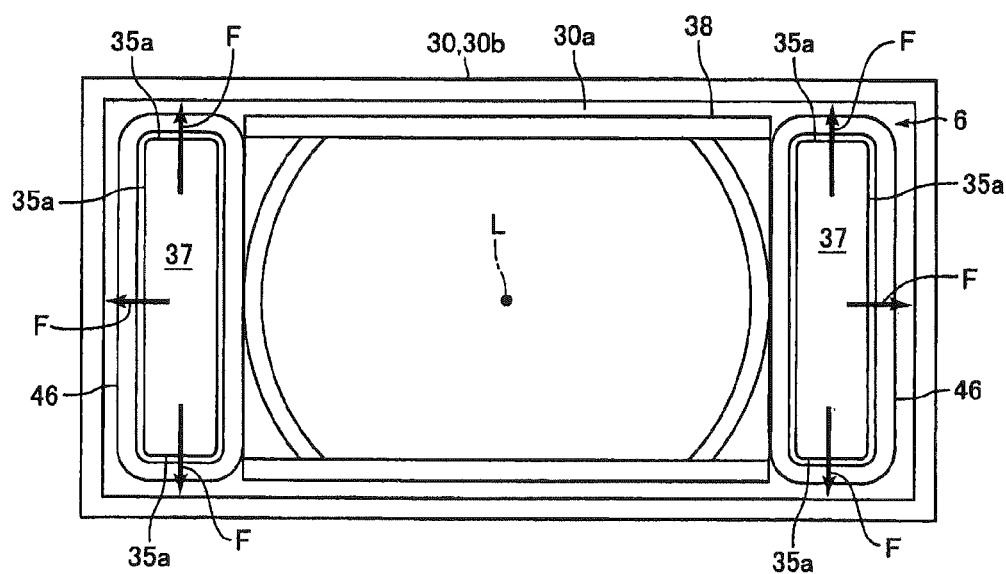
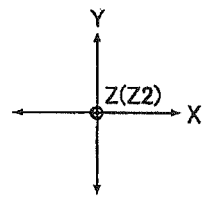

MANUFACTURING METHOD FOR LENS DRIVE DEVICE

CROSS REFERENCE TO RELATED APPLICATION

The present invention claims priority under 35 U.S.C. §119 to Japanese Application No. 2011-001133 filed Jan. 6, 2011, the entire content of which is incorporated herein by reference.

FIELD OF THE INVENTION

At least an embodiment of the present invention may relate to a manufacturing method for a lens drive device used in a relatively small camera which is mounted on a cellular phone or the like.

BACKGROUND

Conventionally, in a lens drive device for driving a photographing lens of a camera which is mounted on a cellular phone or the like, a lens drive device has been known which is provided with a lens holder holding a plurality of lenses and being movable in an optical axis direction and a drive mechanism part for driving the lens holder in the optical axis direction (see, for example, Japanese Patent Laid-Open No. 2009-198948). In the lens drive device described in the Patent Literature, a drive coil wound around in a square shape is fixed on an outer peripheral side of a lens holder and two drive magnets are disposed so as to sandwich the drive coil from both sides in the optical axis direction.

In recent years, in the camera mounted on a cellular phone market or the like, the requirement for making a camera thin has been further increased and, in order to meet the requirement, the requirement for making a lens drive device used in a camera thin has been also increased. However, in the lens drive device described in the Patent Literature, since two drive magnets are disposed so as to sandwich the drive coil fixed to the lens holder from both sides in the optical axis direction, when the device is made thin, a gap space between two drive magnets in the optical axis direction becomes narrow. Therefore, in the lens drive device, when the device is set to make thinner, it is difficult to secure a stroke of the lens.

SUMMARY

In view of the problem described above, at least an embodiment of the present invention may advantageously provide a manufacturing method for a lens drive device by which the lens drive device whose size can be reduced in the optical axis direction is capable of being easily manufactured while a stroke of a lens is secured.

According to at least an embodiment of the present invention, there may be provided a manufacturing method for a lens drive device which is provided with a lens drive module including a movable body which holds a lens and is movable in an optical axis direction of the lens, a fixed body which movably holds the movable body in the optical axis direction, and a drive mechanism for driving the movable body in the optical axis direction, and a circuit board on which the lens drive module is mounted. The drive mechanism is provided with a drive coil which is fixed to the movable body and a drive magnet which is formed in a substantially prism shape or a substantially plate shape and is fixed to the fixed body and is magnetized so that a magnetic pole of its one end face and a magnetic pole of its other end face in the optical axis direction are different from each other. The fixed body is provided with an outer peripheral side magnetic member which is formed of magnetic material in a substantially tube-like shape and structures an outer peripheral face of the fixed body, and an end face side magnetic member which is formed of magnetic material and to which the one end face of the drive magnet is fixed, and an inner peripheral face of the outer peripheral side magnetic member and a side face of the drive magnet are oppositely disposed to each other with a predetermined gap space therebetween. In addition, the outer peripheral side magnetic member, the end face side magnetic member and the drive magnet are disposed so as to form a magnetic field which passes through the drive magnet, the end face side magnetic member and the outer peripheral side magnetic member and turns round to the other end face of the drive magnet from the inner peripheral face of the outer peripheral side magnetic member or turns round to the inner peripheral face of the outer peripheral side magnetic member from the other end face of the drive magnet, and the drive coil is disposed between an other end face side of the drive magnet and the inner peripheral face of the outer peripheral side magnetic member. The manufacturing method includes a module assembling step in which the lens drive module is assembled, a module mounting step in which the lens drive module is soldered by a reflow method after the module assembling step to be mounted on the circuit board, and a magnetizing step in which the drive magnet is magnetized after the module mounting step. Specifically, the fixed body is structured so as to have, a cover member provided with an outer peripheral side magnetic member which is formed of magnetic material in a substantially tube-like shape and structures an outer peripheral face of the fixed body, and an end face side magnetic member which is formed of magnetic material and structures one end, face of the fixed body. In the module assembling step, the drive magnet is fixed to the one end face of the end face side magnetic member and the drive coil is fixed to the movable body to structure the drive mechanism, and the movable body is movably held in the optical axis direction by the fixed body to be assembled into the lens drive module. In the module mounting step, the lens drive module is soldered by a reflow method to be mounted on the circuit board, and the lens drive module and the circuit board are integrated with each other to structure the lens drive device. After that, in the magnetizing step, the drive magnet of the lens drive device after the lens drive module and the circuit board have been integrated with each other is magnetized so that a magnetic pole of its one end face and a magnetic pole of its other end face are different from each other in the optical axis direction.

In accordance with an embodiment of the present invention, in the module assembling step, the lens drive module is assembled by using the drive magnet having been magnetized so that the magnetic pole of its one end face and the magnetic pole of its other end face are different from each other, and the drive magnet is re-magnetized in the magnetizing step. Specifically, in the module assembling step, the lens drive module is assembled by using the drive magnet which has been previously magnetized in a predetermined direction so that the magnetic pole of its one end face and the magnetic pole of its other end face are different from each other and, in the magnetizing step, the drive magnet is re-magnetized in the same direction as the predetermined direction to compensate a magnetic force of the drive magnet which has been demagnetized in the module mounting step. Further, in accordance with an embodiment of the present invention, in the module assembling step, the lens drive module is assembled by using a non-magnetized drive magnet and, in the magnetizing step, the drive magnet is magnetized so that a magnetic pole of the one end face and a magnetic pole of the other end face are different from each other. In the magnetizing step, it may be manufactured that the lens drive device after the lens drive module and the circuit board have been integrated with each other in the module mounting step is disposed at a portion where a magnetic field is formed in the optical axis direction by a coil for magnetizing, and the drive magnet is magnetized so that a magnetic pole of its one end face and a magnetic pole of its other end face are different from each other in the optical axis direction.

In the lens drive device manufactured by the manufacturing method in accordance with an embodiment of the present invention, an inner peripheral face of an outer peripheral side magnetic member which structures an outer peripheral face of the fixed body and is formed in a substantially tube-like shape and a side face of the drive magnet which is formed in a substantially prism shape or a substantially plate shape are oppositely disposed to each other with a predetermined gap space therebetween, and the drive coil is disposed between the other end face side of the drive magnet and the inner peripheral face of the outer peripheral side magnetic member. Therefore, even when the movable body is moved in the optical axis direction, the drive magnet and the drive coil are not interfered with each other. Accordingly, even when the lens drive device is made thin in the optical axis direction, a stroke of the movable body in the optical axis direction (in other words, a stroke of a lens in the optical axis direction) can be secured. In other words, according to the embodiment of the present invention, the lens drive device can be made thin while securing a stroke of a lens.

Further, in the manufacturing method for a lens drive device in accordance with an embodiment of the present invention, the lens drive module is soldered by a reflow method and is mounted on the circuit board in the module mounting step after the module assembling step. Therefore, in comparison with a case that the lens drive module is soldered by a manual operation to be mounted on the circuit board, the lens drive module can be easily mounted on the circuit board. Accordingly, in the embodiment of the present invention, the lens drive device can be manufactured easily. For example, when a lens drive module is mounted on the circuit board by inserting the lens drive module into a connector which has been mounted on the circuit board, the lens drive module can be easily mounted on the circuit board. However, in this case, a connector which is mounted on the circuit board is required and a structure of the lens drive device is complicated. Further, in this case, a mounting step for mounting the connector on the circuit board is also required.

In order to make the lens drive device thin, the drive magnet is required to be thin and small, but a drive force of the drive mechanism is required to be secured. Therefore, in the lens drive device, it is preferable that a magnet having a strong magnetic force such as a neodymium magnet is utilized as the drive magnet. However, the neodymium magnet may easily occur thermal demagnetization when heated. Therefore, in a case that a neodymium magnet or the like which easily occurs thermal demagnetization is used as the drive magnet and, in addition, the lens drive module is soldered by a reflow method to be mounted on the circuit board, thermal demagnetization is occurred in the drive magnet by the heat which is applied in the mounting step and thus the drive force of the drive mechanism may be reduced.

In accordance with an embodiment of the present invention, the drive magnet is magnetized in the magnetizing step after the module mounting step. Therefore, for example, in a case that, in the module assembling step, the lens drive module is assembled by using the drive magnet which has been magnetized so that a magnetic pole of its one end face and a magnetic pole of its other end face are different from each other and, in the magnetizing step, the drive magnet is re-magnetized, even when thermal demagnetization is occurred in the drive magnet in the module mounting step, a magnetic force of the drive magnet which has been demagnetized in the module mounting step can be compensated in the magnetizing step. Alternatively, for example, in a case that, in the module assembling step, the lens drive module is assembled by using a non-magnetized drive magnet and, in the magnetizing step, the drive magnet is magnetized so that a magnetic pole of its one end face and a magnetic pole of its other end face are different from each other, the magnetized drive magnet is not affected by heat which is applied in the module mounting step. Therefore, according to the embodiment of the present invention, even when a neodymium magnet which easily occurs thermal demagnetization is used as the drive magnet and the lens drive module is soldered by a reflow method to be mounted on a circuit board, a magnetic force of the drive magnet after completion of the lens drive device is secured and a drive force of the drive mechanism is secured.

Further, in accordance with an embodiment of the present invention, the drive magnet is magnetized in the magnetizing step after the module mounting step. Therefore, in a case that the drive magnet having been magnetized is re-magnetized in the magnetizing step, even when thermal demagnetization is occurred in the drive magnet in the module assembling step, a magnetic force of the drive magnet which has been demagnetized in the module assembling step can be compensated in the magnetizing step. On the other hand, in a case that a non-magnetized drive magnet is magnetized in the magnetizing step, the drive magnet having been magnetized is not affected by heat which is applied in the module assembling step. Therefore, in accordance with the embodiment of the present invention, a limitation of temperature applied to the drive magnet in the module assembling step can be relaxed. For example, in a case that certain components are adhesively fixed by using a heat curing type adhesive in a module assembling step or, in a case that certain components are fixed by welding or soldering in the module assembling step, a limitation of temperature applied to the drive magnet can be relaxed and a temperature applied to the drive magnet can be set at a high value. As a result, according to the embodiment of the present invention, an assembling method with higher productivity can be selected in the module assembling step and thus an assembling efficiency of the lens drive module can be enhanced.

In addition, in accordance with an embodiment of the present invention, the drive magnet is magnetized in the magnetizing step after the module mounting step. Therefore, in a case that a non-magnetized drive magnet is magnetized in the magnetizing step, foreign matters having a magnetic property are prevented from being attracted by the drive magnets in the module assembling step and the like. Accordingly, reliability of the lens drive device can be enhanced.

In accordance with an embodiment of the present invention, the drive mechanism is provided with a plurality of the drive magnets whose one end faces are magnetized in the same magnetic pole, and the plurality of the drive magnets are simultaneously magnetized in the magnetizing step. According to this manufacturing method, even when the drive mechanism is provided with a plurality of drive magnets, productivity of the lens drive device is enhanced.

In accordance with an embodiment of the present invention, a plurality of the lens drive devices is simultaneously magnetized in the magnetizing step. According to this manufacturing method, productivity of the lens drive device is enhanced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 8(A) is an explanatory view showing a schematic structure of the lens drive device which is viewed from an opposite-to-object side and FIG. 8(B) is a cross-sectional view showing an "H-H" cross section in FIG. 8(A) in which an object side and an opposite-to-object side are reversed.

FIG. 9 is an explanatory view showing a schematic structure of a lens drive device in accordance with another embodiment of the present invention which is viewed from an opposite-to-object side.

FIG. 10(A) is an explanatory view showing a schematic structure of the lens drive device which is viewed from an opposite-to-object side and FIG. 10(B) is a cross-sectional view showing a "J-J" cross section in FIG. 10(A) in which an object side and an opposite-to-object side are reversed.

DETAILED DESCRIPTION OF THE PREFERRED EMBODIMENTS

Embodiments of the present invention will be described below with reference to the accompanying drawings.

Figure 1:
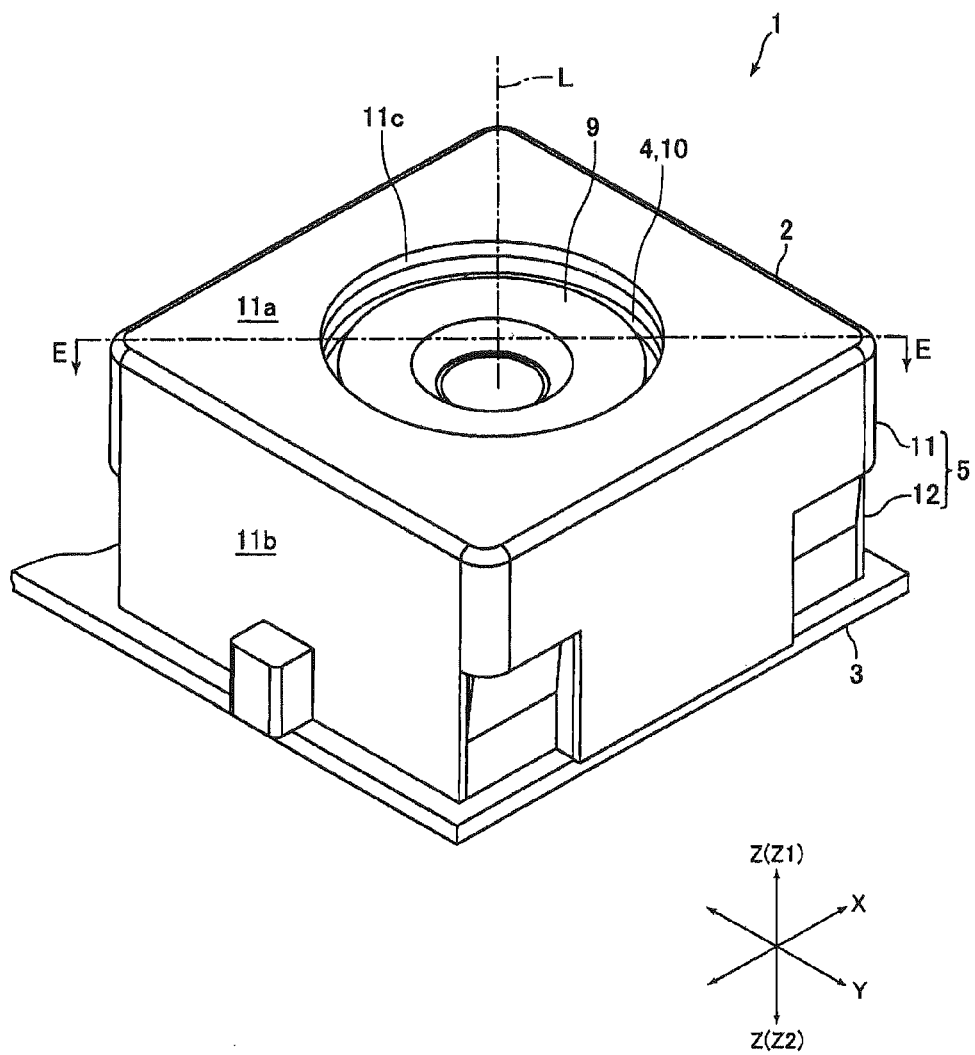
FIG. 1 is a perspective view showing a lens drive device in accordance with an embodiment of the present invention.
Figure 2:
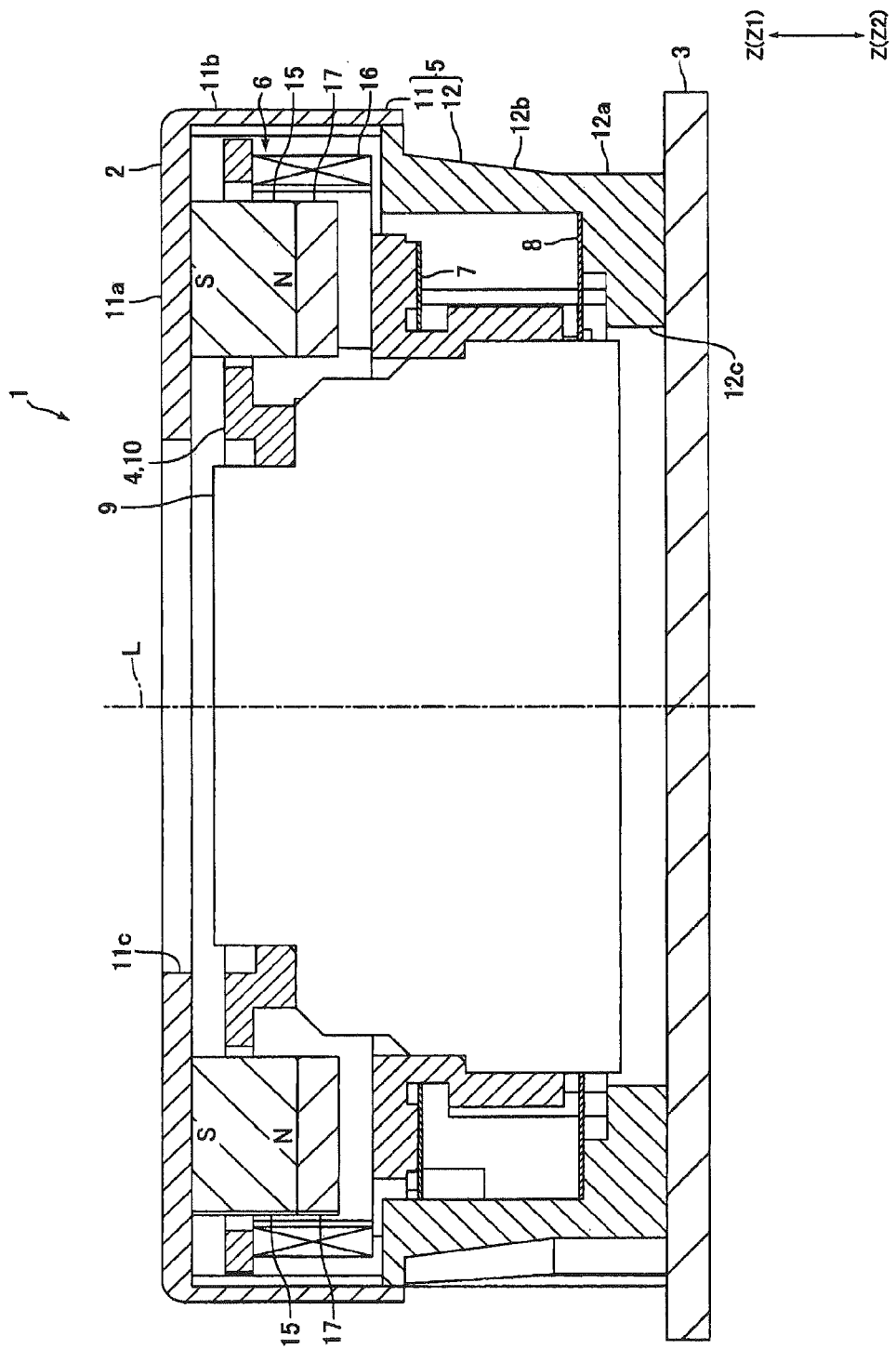
FIG. 2 is a cross-sectional view showing an "E-E" cross section in FIG. 1.
Figure 3:
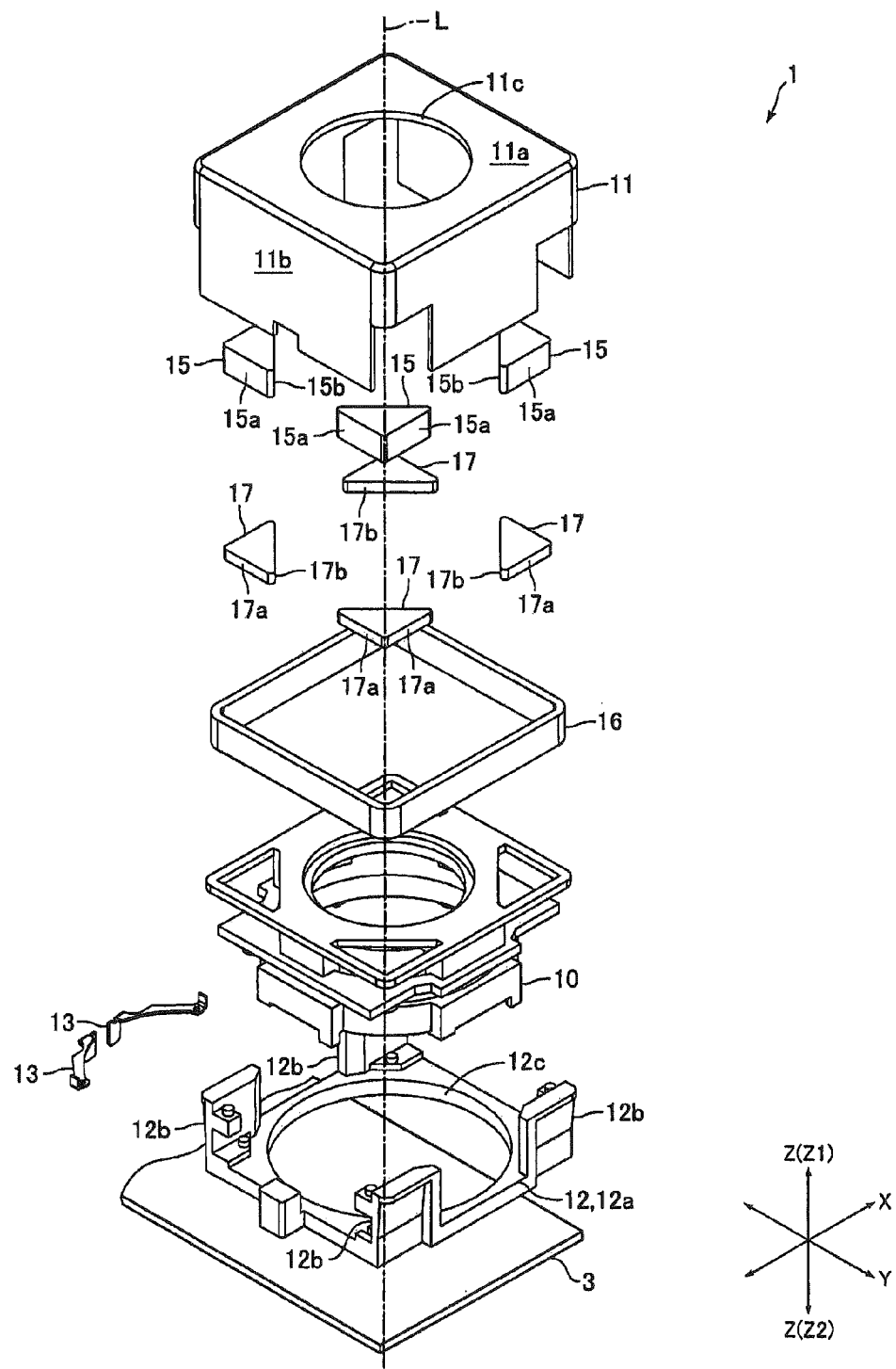
FIG. 3 is an exploded perspective view showing the lens drive device in FIG. 1.

FIG. 1 is a perspective view showing a lens drive device 1 in accordance with an embodiment of the present invention. FIG. 2 is a cross-sectional view showing an "E-E" cross section in FIG. 1. FIG. 3 is an exploded perspective view showing the lens drive device 1 in FIG. 1. In the following description, as shown in FIG. 1 and the like, three directions perpendicular to each other are set to be an "X" direction, a "Y" direction and a "Z" direction and the "X" direction is set to be a right and left direction, the "Y" direction is a front and rear direction, and the "Z" direction is an upper-and-lower direction. Further, a "Z1" direction side in FIG. 1 and the like is set to be an "upper" side and a "Z2" direction side is a "lower" side.

The lens drive device 1 in this embodiment is mounted on a relatively small camera which is used in a cellular phone, a drive recorder, a monitoring camera system or the like and, as shown in FIG. 1, formed in a roughly rectangular prism shape as a whole. In other words, the lens drive device 1 is formed in a roughly rectangular shape when viewed in a direction of an optical axis "L" (optical axis direction) of a lens for photography. In this embodiment, the lens drive device 1 is formed in a roughly square shape when viewed in the optical axis direction. Further, four side faces of the lens drive device 1 are substantially parallel to the right and left direction or the front and rear direction.

In this embodiment, the "Z" direction (upper-and-lower direction) is substantially coincided with the optical axis direction. Further, in the camera on which the lens drive device 1 in this embodiment is mounted, an imaging element not shown is disposed on its lower side and an object to be photographed on an upper side is photographed. In other words, in this embodiment, the upper side ("Z1" direction side) is an object to be photographed side (object side) and the lower side ("Z2" direction side) is an opposite-to-object side (imaging element side, image side).

The lens drive device 1 is, as shown in FIGS. 1 and 2, provided with a lens drive module 2 and a circuit board 3 on which the lens drive module 2 is mounted. The lens drive module 2 is provided with a movable body 4, which holds a lens for photography and is movable in the optical axis direction, a fixed body 5 which movably holds the movable body 4 in the optical axis direction, and a drive mechanism 6 for driving the movable body 4 in the optical axis direction. The movable body 4 is movably held by the fixed body 5 through plate springs 7 and 8 (see FIG. 2). In FIG. 3, the plate springs 7 and 8 are not shown.

The movable body 4 is provided with a sleeve 10 which holds a lens holder 9 to which a plurality of lenses are fixed. The fixed body 5 is provided with a cover member 11 which structures four side faces (outer peripheral face) of the lens drive device 1 and a base member 12 which structures an end face on an opposite-to-object side of the lens drive device 1. In FIG. 3, the lens holder 9 is not shown.

The lens holder 9 is formed in a substantially cylindrical tube shape with a step and a plurality of lenses whose shape when viewed in the optical axis direction is substantially circular is fixed to its inner peripheral side. The sleeve 10 is, for example, formed of resin material. Further, the sleeve 10 is formed in a substantially tube-like shape and an outer peripheral face of the lens holder 9 is fixed to its inner peripheral face.

The cover member 11 is formed of magnetic material and is formed in a roughly bottomed rectangular tube-like shape which is provided with a bottom part 11a and a tube part 11b. The bottom part 11a is disposed on an upper side and structures an end face on an object side of the lens drive device 1. A circular through hole 11c is formed at the center of the bottom part 11a. The cover member 11 is disposed so as to surround outer peripheral sides of the drive mechanism 6 and the movable body 4.

The base member 12 is formed of resin material and is provided with a roughly square-shaped and a flat plate shaped base part 12a and standing-up parts 12b which are stood up toward the upper side from four corners of the base part 12a.

A circular through hole 12c is formed at a center of the base part 12a. The base member 12 is attached to the lower end side of the cover member 11. Further, two terminals 13 (see FIG. 3) are fixed to the base member 12. Further, an IR cut filter (not shown) which transmits a visible light and cuts a near-infrared light (IR) is attached on an inner peripheral side of the base member 12.

The plate springs 7 and 8 are formed of metal material having an electrically conductive property. Further, the plate springs 7 and 8 are structured of a movable body side fixed part which is fixed to the sleeve 10, fixed body side fixed parts which are fixed to the standing-up parts 12b of the base member 12, and spring parts which connect the movable body side fixed part with the fixed body side fixed part. The plate spring 7 is fixed to the sleeve 10 and the base member 12 in a resiliently bent state so that, when an electric current is not supplied to the drive coil 16 described below, a reference face formed on an upper face of the base part 12a and a lower end face of the sleeve 10 are abutted with each other to dispose the movable body 4 at a predetermined reference position.

The lens drive module 2 in this embodiment is provided with two or four pieces of the plate spring 8 and one end of the drive coil 16 described later is electrically connected and fixed to one piece of the plate spring 8 by soldering and the like and the other end of the drive coil 16 is electrically connected and fixed to another piece of the plate spring 8 by soldering and the like. Further, each of two pieces of the plate spring 8 to which end parts of the drive coil 16 are fixed is electrically connected and fixed to each of two terminals 13 by soldering and the like.

The drive mechanism 6 is provided with four drive magnets 15 which are disposed at four corners of the lens drive device 1 (specifically, four corners on an inner side of the cover member 11) and are formed in a substantially triangular prism shape, and one drive coil 16 which is wound around on an outer peripheral side of the sleeve 10. A detailed structure of the drive mechanism 6 will be described below.

An imaging element is mounted on an upper face of the circuit board 3. Further, the upper face of the circuit board 3 is mounted with the lens drive module 2 as described above. Specifically, the terminals 13 are electrically connected and fixed to circuit patterns formed on the upper face of the circuit board 3 and, in this manner, the lens drive module 2 is mounted on the circuit board 3. Further, the circuit board 3 is also mounted with a drive circuit and the like for the lens drive module 2.

Figure 4:
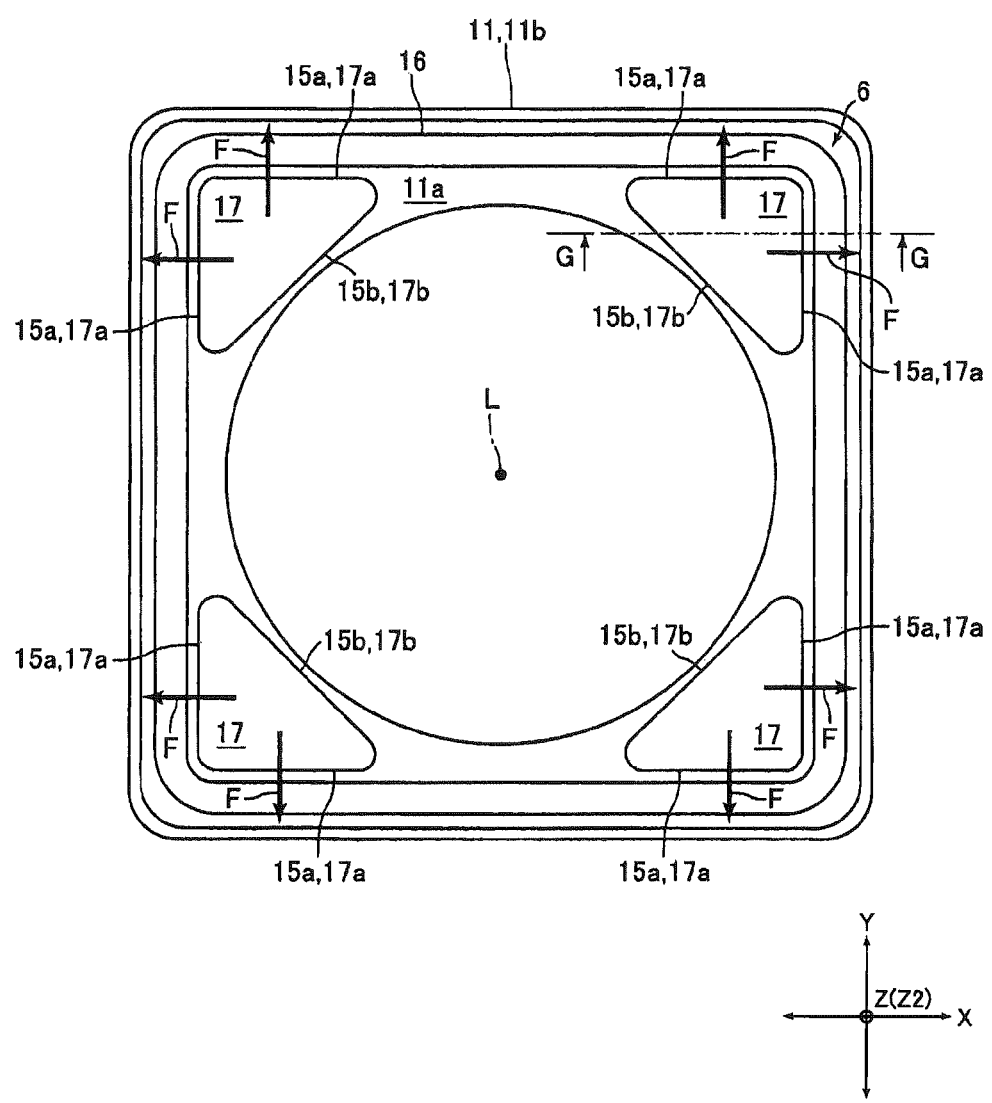
FIG. 4 is a view showing a state that a movable body, a plate spring, a base member and the like are detached from the lens drive device shown in FIG. 1 and which is viewed from an opposite-to-object side.
Figure 5:
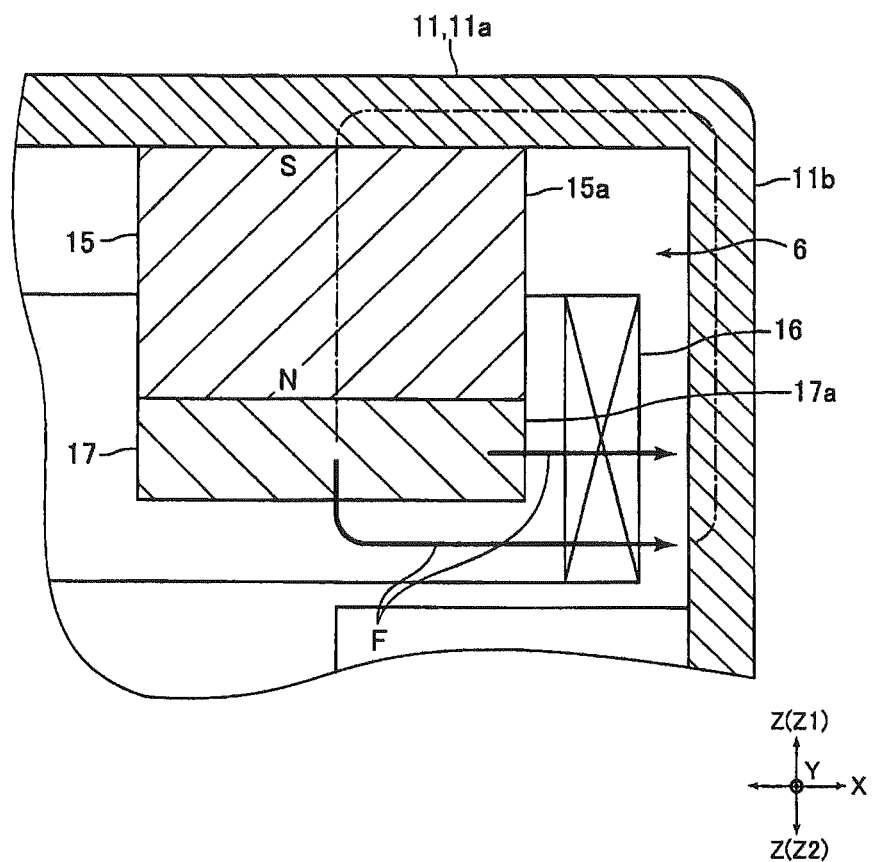
FIG. 5 is a cross-sectional view showing a "G-G" cross section in FIG. 4 where an object side and an opposite-to-object side are reversed.

FIG. 4 is a view showing a state that the movable body 4, the plate springs 7 and 8, the base member 12 and the like are detached from the lens drive device 1 shown in FIG. 1 and which is viewed from an opposite-to-object side. FIG. 5 is a cross-sectional view showing a "G-G" cross section in FIG. 4 in which an object side and an opposite-to-object side are reversed.

The drive magnet 15 is a neodymium magnet. The drive magnet 15 is formed so that its shape when viewed in the upper and lower direction is a substantially rectangular equilateral triangle. The drive magnet 15 is provided with two first rectangular side faces (first side faces) 15a which are substantially parallel to the optical axis "L" and are perpendicular to each other, and one second rectangular side face (second side face) 15b which is substantially parallel to the optical axis "L" and connects two first side faces 13a with each other.

The drive magnet 15 is disposed so that an inner peripheral face of the tube part 11b of the cover member 11 and the first side face 15a are substantially parallel to each other and are oppositely disposed to each other with a predetermined gap space therebetween. Further, the four drive magnets 15 are fixed to the bottom part 11a of the cover member 11. Specifically, upper end faces of the four drive magnets 15 are fixed to the under face of the bottom part 11a in an abutted state with the under face of the bottom part 11a. Further, the upper end faces of the four drive magnets 15 are completely covered by the bottom part 11a. The bottom part 11a in this embodiment is an end face side magnetic member to which one end face of the drive magnet 15 is fixed and the tube part 11b is an outer peripheral side magnetic member which structures an outer peripheral face of the fixed body 5.

A lower end face of the drive magnet 15 is fixed with a magnetic member 17 which is formed of magnetic material. The magnetic member 17 is formed so that, similarly to the drive magnet 15, its shape when viewed in the upper and lower direction is a substantially rectangular equilateral triangle. The magnetic member 17 is provided with two first end faces 17a which are perpendicular to each other and one second end face 17b which connects the two first end faces 17a with each other. The magnetic member 17 is fixed to a lower end face of the drive magnet 15 so that its thickness direction is substantially coincided with the upper and lower direction. Further, the magnetic member 17 is fixed to the lower end face of the drive magnet 15 so that the first end face 17a is disposed so as to form the same flat face with the first side face 15a of the drive magnet 15 and the second end face 17b is disposed so as to form the same flat face with the second side face 15b of the drive magnet 15.

The drive magnet 15 is magnetized in two poles in the upper and lower direction so that a magnetic pole of its upper end face and a magnetic pole of its lower end face are different from each other. For example, the upper end face of the drive magnet 15 is magnetized in an "S"-pole and the lower end face of the drive magnet 15 is magnetized in an "N"-pole. Therefore, as shown in FIG. 5, in the lens drive device 1, a magnetic field "F" is formed which passes through the tube part 11b and the bottom part 11a of the cover member 11, the drive magnet 15 and the magnetic member 17 and turns around to the inner peripheral face of the tube part 11b from the under face of the magnetic member 17 and the first end faces 17a. In other words, in the lens drive device 1, a magnetic field "F" is formed which passes through the tube part 11b and the bottom part 11a of the cover member 11 and the drive magnet 15 and turns around to the inner peripheral face of the tube part 11b from the lower end face of the drive magnet 15 through the magnetic member 17. The magnetic field "F" is, as shown in FIG. 4, turned round from the under face of the magnetic member 17 and the first end face 17a to a portion of the inner peripheral face of the tube part 11b which is oppositely disposed so as to be substantially parallel to the first side face 15a of the drive magnet 15 and the first end face 17a of the magnetic member 17. In this embodiment, in FIG. 5, although not shown, the magnetic field "F" is also turned round to the inner peripheral face of the tube part 11b from a vicinity of an abutting portion of the lower end face of the drive magnet 15 with the upper face of the magnetic member 17.

The drive coil 16 is wound around in a substantially flat rectangular tube shape whose shape viewed in the upper and lower direction is a substantially square shape. A width of the drive coil 16 in the upper and lower direction is thicker than a thickness of the magnetic member 17. The drive coil 16 is fixed to an outer peripheral face of the sleeve 10 with an adhesion or the like.

The drive coil 16 is, as shown in FIG. 4, disposed along the inner peripheral face of the tube part 11b of the cover member 11. Four corners and their vicinity portions of the drive coil 16 are disposed in spaces between the first side faces 15a of the drive magnets 15, the first end faces 17a of the magnetic members 17 and the tube part 11b of the cover member 11. Further, the four corners and their vicinity portions of the drive coil 16 are disposed in the inside of the magnetic field "F" which is turned round to the inner peripheral face of the tube part 11b from the under face of the magnetic member 17 and the first end face 17a.

In this embodiment, the drive coil 16 is disposed so that the magnetic member 17 is always disposed on the inner peripheral side of the drive coil 16 in a moving range of the movable body 4. In other words, in the moving range of the movable body 4, the drive coil 16 is disposed so that the lower end face of the drive coil 16 is not moved to an upper side with respect to the under face of the magnetic member 17 and the upper end face of the drive coil 16 is not moved to a lower side with respect to the upper face of the magnetic member 17. When an electric current is supplied to the drive coil 16, the movable body 4 is moved in the upper and lower direction (optical axis direction) through an operation between the drive magnets 15 and the drive coil 16.

In order to manufacture the lens drive device 1, first, a lens drive module 2 is assembled (module assembling step). In this embodiment, the lens drive module 2 in a state before mounted on the circuit board 3 by a reflow method is assembled by using previously magnetized drive magnets 15 in the module assembling step.

When the lens drive module 2 has been assembled, the lens drive module 2 is soldered by a reflow method to be mounted on the circuit board 3 (module mounting step). In other words, when assembling of the lens drive module 2 has been completed, the lens drive module 2 is placed on a circuit board 3 so that terminals 13 are disposed on soldering-pastes which are applied to circuit patterns on the circuit board 3. After that, the lens drive module 2 and the circuit board 3 are heated in a reflow furnace and then cooled and, in this manner, the lens drive module 2 is soldered and mounted on the circuit board 3. In this embodiment, an imaging element has been previously soldered and mounted on the circuit board 3 before the lens drive module 2 is mounted and, in the module mounting step, the lens drive module 2 is placed on the circuit board 3 so as to cover the imaging element and then the lens drive module 2 is mounted on the circuit board 3. In the module mounting step, components other than the lens drive module 2 may be also mounted on the circuit board 3 as needed. Further, it may be manufactured that, in the module mounting step, an imaging element is placed on the circuit board 3 and then the lens drive module 2 is placed on the circuit board 3 so as to cover the imaging element and, after that, the lens drive module 2 and the imaging element are simultaneously soldered by a reflow method to be mounted on the circuit board 3.

Figure 6:
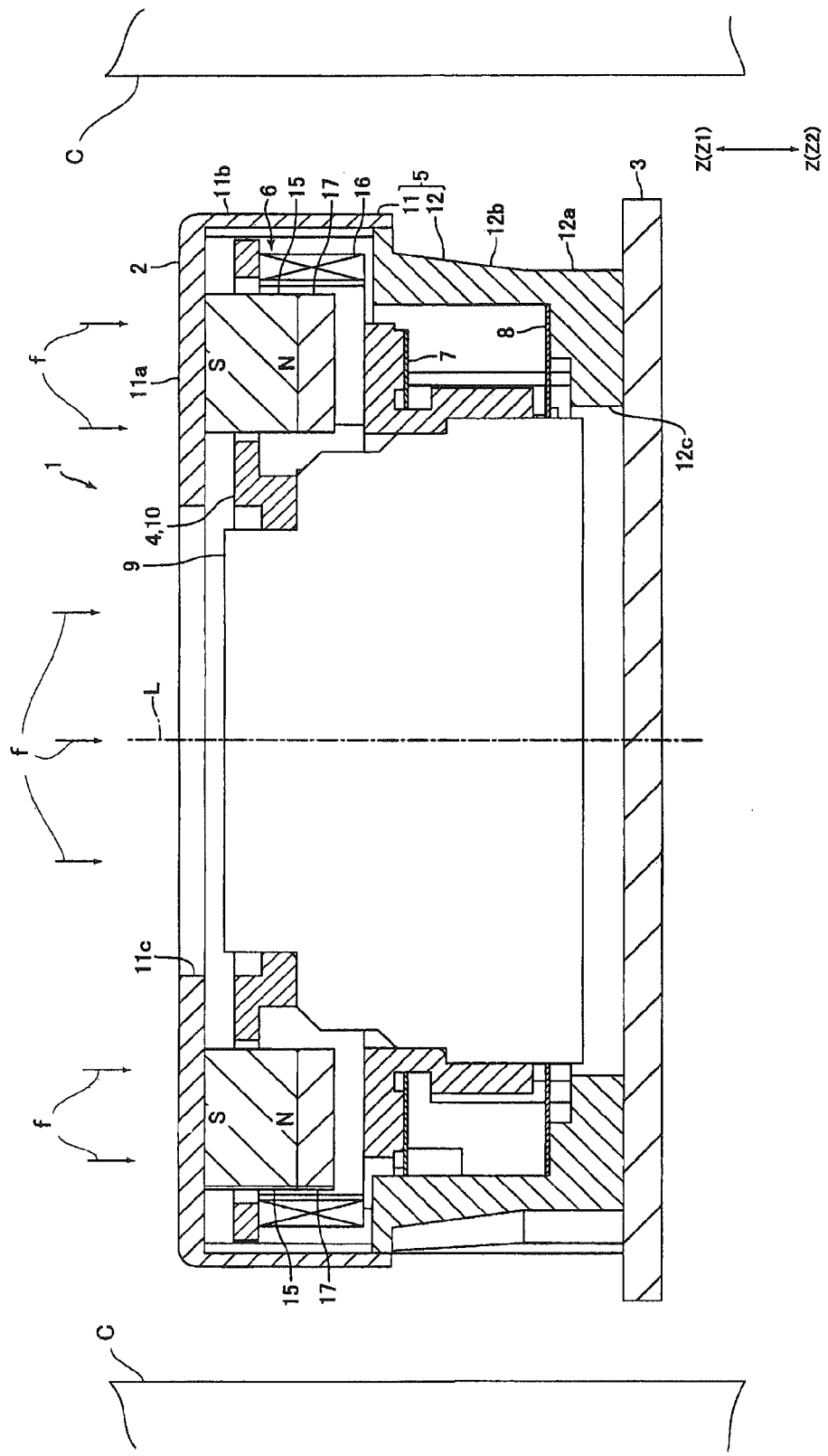
FIG. 6 is an explanatory view showing a state where magnets in the lens drive device shown in FIG. 1 are re-magnetized by an air-core coil.

When the lens drive module 2 has been mounted on the circuit board 3, as shown in FIG. 6, the lens drive module 2 is disposed together with the circuit board 3 in an air-core coil "C" for magnetizing and the drive magnets 15 are magnetized (magnetizing step). In other words, when the lens drive module 2 has been mounted on the circuit board 3, the lens drive device 1 is disposed within the air-core coil "C" for magnetizing in the magnetizing step and the drive magnets 15 are re-magnetized. In the magnetizing step, the lens drive device 1 is disposed in the air-core coil "C" so that an axial direction of the air-core coil "C" for magnetizing is coincided with the optical axis direction of the lens drive device 1. In other words, the lens drive device 1 is disposed in the air-core coil "C" so that a direction of the magnetic field "f" for magnetizing which is formed by the air-core coil "C" is coincided with the optical axis direction of the lens drive device 1. Specifically, the lens drive device 1 is disposed on an inner side of a tubular type air-core coil "C" so that the direction of the magnetic field "f" for magnetizing which is formed by the air-core coil "C" is coincided with the magnetizing direction of the drive magnet 15 which has been previously magnetized. According to this manufacturing method, the drive magnet 15 of the lens drive module 2 after the module mounting step is magnetized again and thus, even when thermal demagnetization is occurred in the drive magnet in the module mounting step, a magnetic force of the drive magnet having been demagnetized in the module mounting step can be compensated in the magnetizing step. In this embodiment, the base member 12 is formed of resin material and the cover member 11 formed of magnetic material is formed in a substantially bottomed rectangular tube shape comprised of the bottom part 11a and the tube part 11b so that its base member 12 side is opened. Therefore, the drive magnet 15 after the module mounting step is surely magnetized in the optical axis direction. In accordance with an embodiment of the present invention, when a base member 12 side of the cover member 11 is opened, the drive magnet 15 is easily magnetized. However, even when the cover member 11 formed of magnetic material is disposed on both sides in the optical axis direction of the drive magnet 15 or, even when a part of the base member 12 or the entire base member 12 is formed of magnetic material, the drive magnet 15 after the module mounting step can be magnetized in the optical axis direction by applying a strong magnetic field "f" for magnetizing which is formed by the air-core coil "C". In the embodiment of the present invention, as described above, the lens drive device 1 is provided with four drive magnets 15 and the four drive magnets 15 are simultaneously magnetized in the magnetizing step. Further, in the magnetizing step in this embodiment, a plurality of the lens drive devices 1 is disposed within the air-core coil "C" for magnetizing and a plurality of the lens drive devices 1 is simultaneously magnetized. Specifically, in the magnetizing step in this embodiment, a plurality of the lens drive devices 1 is disposed in the air-core coil "C" so that a plurality of the lens drive devices 1 is superposed on each other in the optical axis direction in a region where the direction of the magnetic field formed by the air-core coil "C" is coincided with the direction where the drive magnet 15 is to be magnetized and a plurality of the lens drive devices 1 is simultaneously magnetized.

As described above, in the lens drive device 1 in this embodiment, the four corners of the drive coil 16 and their vicinity portions are disposed in gap spaces between the first side faces 15a of the drive magnets 15, the first end faces 17a of the magnetic members 17 and the tube part 11b of the cover member 11. Therefore, even when the movable body 4 is moved in the optical axis direction, the drive magnets 15 and the drive coil 16 are not interfered with each other. Therefore, in this embodiment, even when the size of the lens drive device 1 is reduced in the upper and lower direction, a stroke of the lens which is held in the movable body 4 is secured. In other words, in this embodiment, the lens drive device 1 can be made thin while securing a stroke of the lens.

In this embodiment, the lens drive module 2 is soldered by a reflow method and is mounted on the circuit board 3 in the module mounting step after a module assembling step. Therefore, in comparison with a case that the lens drive module 2 is soldered by a manual operation to be mounted on the circuit board 3, the lens drive module 2 can be mounted on the circuit board 3 easily. Accordingly, in this embodiment, the lens drive device 1 can be manufactured easily.

On the other hand, in this embodiment, the lens drive module 2 is soldered by a reflow method and is mounted on the circuit board 3 in the module mounting step and thus heat demagnetization is occurred in the drive magnets 15, which is a neodymium magnet, due to influence of heat at the time of mounting and a drive force of the drive mechanism 6 may be lowered. However, in this embodiment, the drive magnets 15 are re-magnetized in the magnetizing step after the module mounting step and thus, even when thermal demagnetization is occurred in the drive magnets 15 in the module mounting step, a magnetic force of the drive magnet 15 having been demagnetized in the module mounting step is compensated in the magnetizing step. Therefore, in this embodiment, even when a neodymium magnet which is easy to occur thermal demagnetization is used as the drive magnet 15 and the lens drive module 2 is soldered by a reflow method to be mounted on the circuit board 3, a magnetic force of the drive magnet 15 is secured after the lens drive device 1 has been manufactured and thus a drive force of the drive mechanism 6 can be secured.

Further, in this embodiment, the drive magnet 15 is re-magnetized in the magnetizing step after the module mounting step and thus, even when thermal demagnetization is occurred in the drive magnet 15 in the module assembling step, a magnetic force of the drive magnet 15 which is demagnetized in the module assembling step can be compensated in the magnetizing step. Therefore, in this embodiment, a limitation of temperature applied to the drive magnet 15 in the module assembling step can be relaxed. For example, when predetermined components are adhesively fixed by using a heat curing type adhesive in the module assembling step or, when predetermined components are fixed by welding or soldering in the module assembling step, a limitation of temperature applied to the drive magnet 15 is relaxed and a temperature applied to the drive magnet 15 can be set at a high value. As a result, in this embodiment, an assembling method for higher productivity can be selected in the module assembling step and thus an assembling efficiency of the lens drive module 2 can be enhanced.

In this embodiment, four drive magnets 15 structuring the lens drive device 1 are simultaneously magnetized in the magnetizing step. Further, in the magnetizing step in this embodiment, a plurality of the lens drive devices 1 is disposed in an air-core coil "C" for magnetizing and a plurality of the lens drive devices 1 are simultaneously magnetized. Therefore, productivity of the lens drive device 1 can be enhanced.

In this embodiment, the bottom part 11a with which an upper end face of the drive magnet 15 is abutted is integrally formed with the tube part 11b and thus a magnetic flux is prevented from being leaked out from a portion between the bottom part 11a and the tube part 11b to the outside of the lens drive device 1. Further, in this embodiment, the first side face 15a of the drive magnet 15 and the inner peripheral face of the tube part 11b are substantially parallel to each other and thus, a direction of the magnetic line of force generated from the drive magnet 15 is easily directed from the under face of the magnetic member 17 and the first end face 17a to the inner peripheral face of the tube part 11b. Therefore, in this embodiment, a magnetic flux density turning round from the under face of the magnetic member 17 and the first end face 17a to the inner peripheral face of the tube part 11b can be increased.

Further, in this embodiment, the magnetic member 17 is fixed to the lower end face of the drive magnet 15 and a shape of the drive magnet 15 and a shape of the magnetic member 17 when viewed in the upper and lower direction are substantially the same as each other and thus magnetic flux can be concentrated on the magnetic member 17. Further, in this embodiment, a shape of the drive magnet 15 and a shape of the magnetic member 17 when viewed in the upper and lower direction are substantially the same as each other. Therefore, the direction of the magnetic lines of force generated from the drive magnet 15 is easily directed from the under face of the magnetic member 17 and the first end face 17a to the inner peripheral face of the tube part 11b. Accordingly, in this embodiment, a magnetic flux density directing from the under face of the magnetic member 17 and the first end face 17a to the inner peripheral face of the tube part 11b can be increased effectively.

In this embodiment, the drive magnet 15 is disposed at four corners of the lens drive device 1 whose shape when viewed in the optical axis direction is a roughly square shape. Therefore, the drive magnet 15 is disposed at the four corners of the lens drive device 1 which are left as dead spaces of the lens drive device 1 for driving a lens whose shape is a substantially circular shape when viewed in the optical axis direction. Further, in this embodiment, the drive magnet 15 is formed in a substantially triangular prism shape and thus, even when spaces of four corners of the lens drive device 1 are made small, the drive magnet 15 can be disposed. Therefore, in this embodiment, the size of the lens drive device 1 can be reduced.

Figure 7:
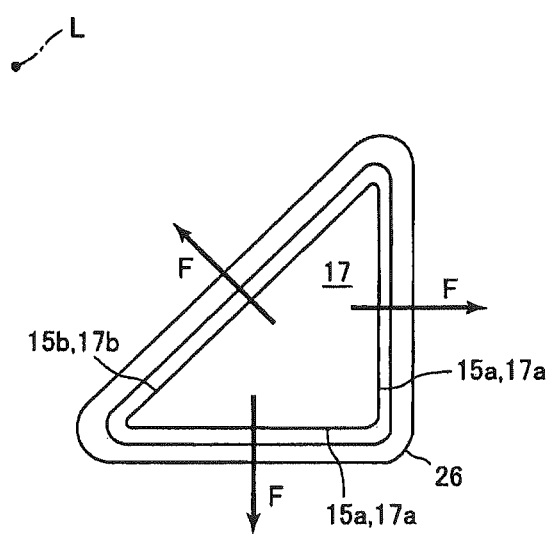
FIG. 7 is an explanatory view showing a structure of a drive coil in accordance with another embodiment of the present invention.

FIG. 7 is an explanatory view showing a structure of a drive coil 26 in accordance with another embodiment of the present invention.

In the embodiment described above, the drive mechanism 6 is provided with one drive coil 16 which is disposed along the inner peripheral face of the tube part 11b of the cover member 11. However, the dive mechanism 6 may be provided, instead of the drive coil 16, as shown in FIG. 7, with four drive coils 26 which are wound around in a substantially triangular tube-like shape and whose inner peripheral side is oppositely disposed to the side faces 15a and 15b of the drive magnet 15 through a predetermined gap space. In this first modified embodiment, the drive coil 26 is wound around so that a shape when viewed in the upper and lower direction is a substantially rectangular equilateral triangular shape. Further, each of four drive coils 26 is fixed to the sleeve 10 so that an inner peripheral face of the drive coil 26 and the side faces 15a and 15b of the drive magnet 15 are substantially parallel to each other through a predetermined gap space. Also in this case, the drive magnet 15 can be magnetized so that the magnetic pole of one end face and the magnetic pole of the other end face in the optical axis direction are different from each other and thus the drive magnet 15 of the lens drive module 2 after the module mounting step can be magnetized again.

Figure 8A:
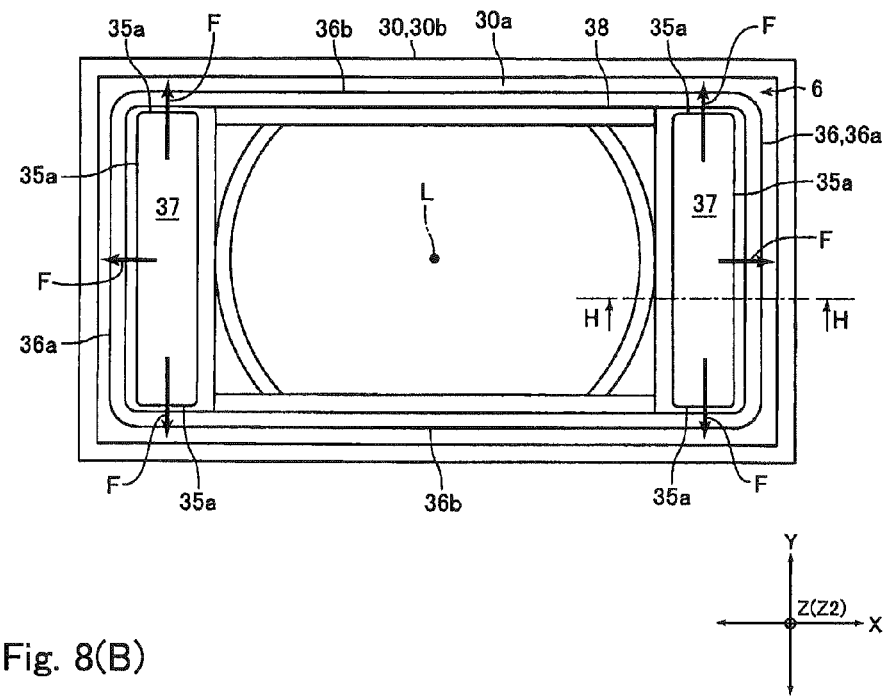
FIGS. 8(A) and 8(B) are explanatory views showing a schematic structure of a lens drive device in accordance with another embodiment of the present invention.
Figure 8B:
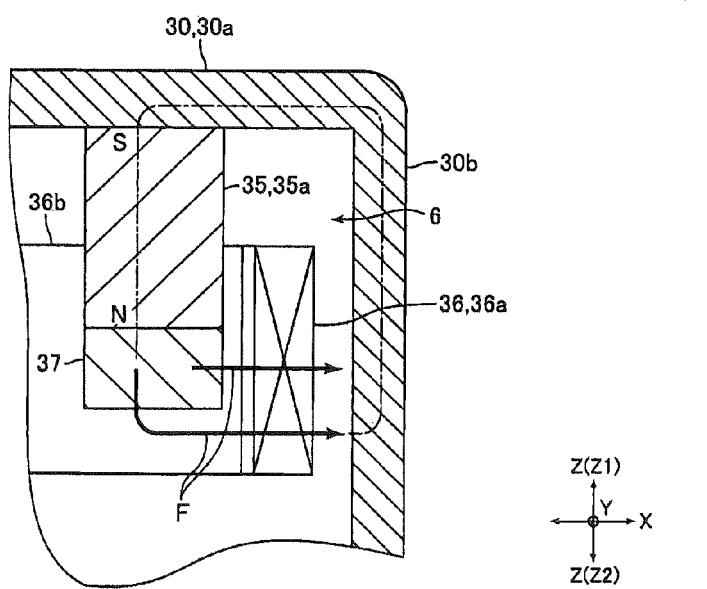

FIGS. 8(A) and 8(B) are explanatory views showing a schematic structure of a lens drive device in accordance with another embodiment of the present invention. FIG. 8(A) is an explanatory view showing a schematic structure of the lens drive device 1 which is viewed from an opposite-to-object side and FIG. 8(B) is a cross-sectional view showing an "H-H" cross section in FIG. 8(A) in which an object side and an opposite-to-object side are reversed. FIG. 9 is an explanatory view showing a schematic structure of a lens drive device 1 in accordance with another embodiment of the present invention which is viewed from an opposite-to-object side.

In the embodiment described above, the lens drive device 1 is formed so that a shape when viewed in the optical axis direction is a substantially square shape. Further, the drive magnet 15 formed in a substantially triangular prism shape is disposed at four corners of the lens drive device 1. However, the present invention is not limited to this embodiment. For example, the lens drive device 1 may be formed so that a shape when viewed in the optical axis direction is a substantially rectangular shape. Further, in this case, as shown in FIG. 8(A), the drive magnet 35 may be formed in a substantially rectangular prism-like shape and may be disposed on both sides of the lens drive device 1 in a direction substantially parallel to a long side of the lens drive device 1 when viewed in the optical axis direction. The lens drive device 1 in accordance with this second modified embodiment is provided with a sleeve 38 corresponding to the sleeve 10 in the embodiment described above and a cover member 30 corresponding to the cover member 11.

The drive magnet 35 is disposed so that its three side faces 35a and an inner peripheral face of a tube part 30b of the cover member 30 are substantially parallel to each other and are faced each other through a predetermined gap space. Further, the drive magnet 35 is fixed to an under face of the bottom part 30a of the cover member 30 in an abutted state. A magnetic member 37 formed of magnetic material is fixed to a lower end face of the drive magnet 35. In the second modified embodiment, the bottom part 30a is an end face side magnetic member to which one end face of the drive magnet 35 is fixed and the tube part 30b is an outer peripheral side magnetic member which structures the outer peripheral face of the fixed body 5.

Also in this embodiment, the drive magnet 35 is magnetized in two poles in the upper and lower direction so that the magnetic pole of its upper end face and the magnetic pole of its lower end face are different from each other and thus the drive magnet 15 can be re-magnetized in the magnetizing step after the module mounting step. Therefore, the lower side of the cover member 30 is opened and, as shown in FIG. 8(B), in the lens drive device 1 in accordance with the second modified embodiment, the magnetic field "F" is formed so as to pass through the tube part 30b and the bottom part 30a of the cover member 30 and the drive magnet 35 and turn round to the inner peripheral face of the tube part 30b from the lower end face of the drive magnet 35 through the magnetic member 37. Similarly to the above-mentioned embodiment, the magnetic field "F" is also turned round to the inner peripheral face of the tube part 30b from the vicinity of an abutting portion of the lower end face of the drive magnet 35 with the upper face of the magnetic member 37.

The drive coil 36 is wound around so that its shape when viewed in the upper and lower direction is a substantially rectangular shape and is provided with short side parts 36a and long side parts 36b longer than the short side part 36a. The drive coil 36 is fixed to the outer peripheral face of the sleeve 38 so as to dispose along the inner peripheral face of the tube part 30b. Both end sides of the long side parts 36b and the short side parts 36a of the drive coil 36 are disposed in gap spaces between three side faces 35a of the drive magnets 35 and the inner peripheral face of the tube part 30b. Further, both end sides of the long side parts 36b and the short side parts 36a are disposed in the magnetic field "F" which is turned round from the under face and the end face of the magnetic member 37 to the inner peripheral face of the tube part 30b. In accordance with an embodiment of the present invention, instead of using the drive coil 36, as shown in FIG. 9, two drive coils 46 which are wound around in a substantially rectangular tube shape and whose inner peripheral sides are oppositely disposed to the side faces of the drive magnets 35 through a predetermined gap space may be fixed to an outer peripheral face of sleeve 38.

Figure 10A:
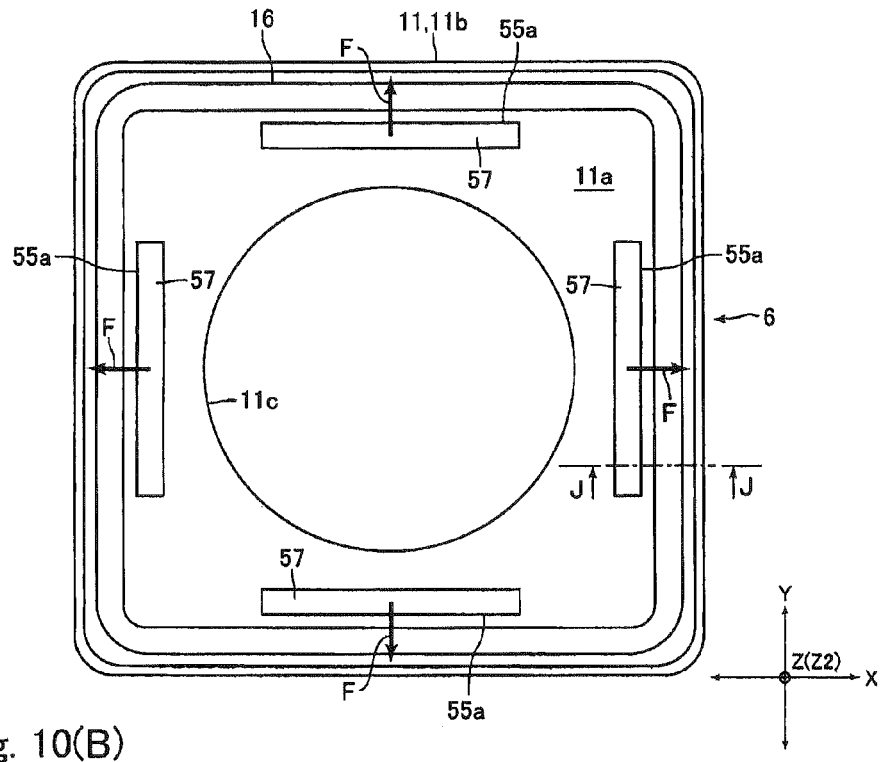
FIGS. 10(A) and 10(B) are explanatory views showing a schematic structure of a lens drive device in accordance with another embodiment of the present invention.
Figure 10B:
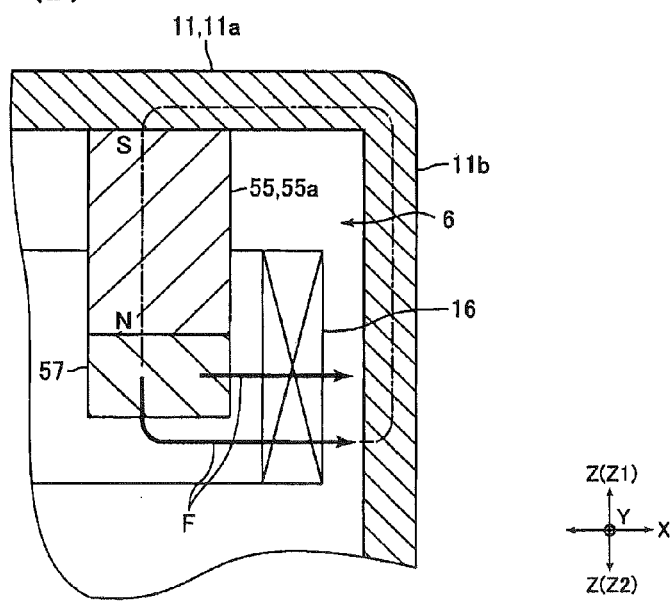

FIGS. 10(A) and 10(B) are explanatory views showing a schematic structure of the lens drive device 1 in accordance with another embodiment of the present invention. FIG. 10(A) is an explanatory view showing a schematic structure of the lens drive device 1 which is viewed from an opposite-to-object side and FIG. 10(B) is a cross-sectional view showing a "J-J" cross section in FIG. 10(A) in which an object side and an opposite-to-object side are reversed.

In the embodiment described above, the drive magnet 15 formed in a substantially triangular prism shape is disposed at four corners of the lens drive device 1. However, the present invention is not limited to this embodiment. For example, as shown in FIG. 10(A), a drive magnet 55 which is formed in a substantially rectangular plate shape may be disposed along each of four side faces of the lens drive device 1.

In the third modified embodiment, the drive magnet 55 is disposed so that its one side face 55a and an inner peripheral face of the tube part 11b of the cover member 11 are oppositely disposed in substantially parallel to each other through a predetermined gap space. Further, the drive magnet 55 is fixed to an under face of the bottom part 11a of the cover member 11 in an abutted state. A magnetic member 57 formed of magnetic material is fixed to a lower end face of the drive magnet 55. The magnetic member 57 is formed in a flat plate shape so that its shape when viewed in the upper and lower direction is a substantially rectangular shape which is similar to the drive magnet 55.

Also in the third modified embodiment, the drive magnet 55 is magnetized in two poles in the upper and lower direction so that a magnetic pole of its upper end face and a magnetic pole of its lower end face are different from each other. Therefore, similarly to the embodiments described above, the drive magnets 55 can be re-magnetized in the magnetizing step after the module mounting step. Further, in the lens drive device 1 in accordance with the third modified embodiment, for example, a magnetic field "F" is formed which is passed through the tube part 11b, the bottom part 11a, the drive magnet 55 and the magnetic member 57 and is turned round to the inner peripheral face of the tube part 11b from the under face and the end face of the magnetic member 57. In the third modified embodiment, similarly to the embodiments described above, the magnetic field "F" is also turned round to the inner peripheral face of the tube part 11b from the vicinity of an abutting portion of the lower end face of the drive magnet 55 with the upper face of the magnetic member 57.

A part of the drive coil 16 is disposed in a gap space between a side face 55a of the drive magnet 55 and the inner peripheral face of the tube part 11b. Further, a part of the drive coil 16 is disposed in the magnetic field "F" which is turned round from the under face, the end face of the magnetic member 57 and the like to the inner peripheral face of the tube part 11b.

In the embodiments described above, the lens drive module 2 is assembled in the module assembling step by using the drive magnets 15 having been previously magnetized and then the drive magnets 15 are re-magnetized in the magnetizing step. However, the present invention is not limited to this embodiment. For example, it may be manufactured that the lens drive module 2 is assembled by using non-magnetized drive magnets 15 in the module assembling step and then, the drive magnets 15 are magnetized in the magnetizing step so that a magnetic pole of its upper end face and a magnetic pole of its lower end face of the drive magnet 15 are different from each other. In this case, heat applied in the module mounting step does not affect the magnetized drive magnet 15. Further, in this case, the magnetized drive magnet 15 is also not affected by heat which is applied in the module assembling step. Therefore, also in this case, similar effects to those of the embodiments described above can be obtained. Further, in this case, foreign matters having a magnetic property are prevented from being attracted by the drive magnets 15 in the module assembling step and the like and thus reliability of the lens drive device 1 can be enhanced.

In the embodiments described above, a plurality of the lens drive devices 1 is disposed in the air-core coil "C" for magnetizing in the magnetizing step and the plurality of the lens drive devices 1 is simultaneously magnetized. However, the present invention is not limited to this embodiment. For example, one piece of the lens drive device 1 may be disposed in the air-core coil "C" in the magnetizing step for magnetizing the one piece of the lens drive device 1.

In the embodiments described above, an imaging element is mounted on the circuit board 3. However, the present invention, is not limited to this embodiment. For example, it may be structured that an imaging element is mounted on a circuit board (small circuit board) which is smaller than the circuit board 3 and the small circuit board is mounted on the circuit board 3. In this case, it may be manufactured that, in the module mounting step, a small circuit board is previously mounted on the circuit board 3 before the lens drive module 2 is mounted and then, the lens drive module 2 is placed on the circuit board 3 so as to cover the small circuit board and the lens drive module 2 is mounted on the circuit board 3. Alternatively, it may be manufactured that a small circuit board is assembled into the lens drive module 2 in the module assembling step and then, a small circuit board is mounted on the circuit board 3 together with the lens drive module 2 in the module mounting step.

In the embodiments described above, the magnetic member 17 is fixed to a lower end face of the drive magnet 15. However, it may be structured that no magnetic member 17 is fixed to the lower end face of the drive magnet 15. Further, in the embodiments described above, the cover member 11 is structured of the bottom part 11*a* and the tube part 11*b* and the bottom part 11*a* and the tube part 11*b* are integrally formed with each other as one piece. However, it may be structured that the bottom part formed of magnetic material and the tube part formed of magnetic material are formed in a separated manner. Further, it may be structured that a flange part protruding from an end part on the circuit board 3 side of the tube part 11*b* to an inner side is formed in the cover member 11 so as to face the bottom part 11*a* and the flange part is fixed to the base member 12.

In the embodiments described above, the drive magnet 15 is formed in a substantially triangular prism shape. However, the drive magnet 15 may be formed in a substantially polygonal prism shape other than a substantially triangular prism shape or may be formed in a substantially cylindrical shape or a substantially elliptic cylindrical shape. Further, in the embodiments described above, the lens drive device 1 is formed so that a shape when viewed in the optical axis direction is a roughly quadrangular shape. However, the lens drive device 1 may be formed so that a shape when viewed in the optical axis direction is a roughly polygonal shape other than a roughly rectangular shape, or may be formed so that a shape when viewed in the optical axis direction is a roughly circular shape or a roughly elliptic shape. In this case, the drive coil 16 may be wound around, for example, in a cylindrical tube shape depending on a shape of the lens drive device 1 or a shape of the drive magnet 15 when viewed in the optical axis direction. Further, the drive coil 26 in the first modified embodiment may be also wound around, for example, in a cylindrical tube shape depending on a shape of the lens drive device 1 or a shape of the drive magnet 15 when viewed in the optical axis direction.

In the embodiment described above, the drive magnet 15 is disposed at four corners of the lens drive device 1. However, when a sufficient drive force of the drive mechanism 6 is obtained, the drive magnet 15 may be disposed at three positions, two positions or only one position of four corners of the lens drive device 1.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A manufacturing method for a lens drive device provided with:
   a lens drive module which comprises:
      a movable body which holds a lens and is movable in an optical axis direction of the lens;
      a fixed body which movably holds the movable body in the optical axis direction; and
      a drive mechanism for driving the movable body in the optical axis direction; and
   a circuit board on which the lens drive module is mounted;
   wherein the drive mechanism is provided with a drive coil which is fixed to the movable body and a drive magnet which is formed in a substantially prism shape or a substantially plate shape and is fixed to the fixed body and is magnetized so that a magnetic pole of one end face and a magnetic pole of an other end face in the optical axis direction are different from each other;
   wherein the fixed body is provided with an outer peripheral side magnetic member which is formed of magnetic material in a substantially tube-like shape and structures an outer peripheral face of the fixed body, and an end face side magnetic member which is formed of magnetic material and to which the one end face of the drive magnet is fixed;
   wherein an inner peripheral face of the outer peripheral side magnetic member and a side face of the drive magnet are oppositely disposed to each other with a predetermined gap space therebetween;
   wherein the outer peripheral side magnetic member, the end face side magnetic member and the drive magnet are disposed so as to form a magnetic field which passes through the drive magnet, the end face side magnetic member and the outer peripheral side magnetic member and to turn round to the other end face of the drive magnet from the inner peripheral face of the outer peripheral side magnetic member or to turn round to the inner peripheral face of the outer peripheral side magnetic member from the other end face of the drive magnet; and
   wherein the drive coil is disposed between an other end face side of the drive magnet and the inner peripheral face of the outer peripheral side magnetic member;
   the manufacturing method comprising:
   a module assembling step in which the lens drive module is assembled;
   a module mounting step in which the lens drive module is soldered by a reflow method after the module assembling step to be mounted on the circuit board; and
   a magnetizing step in which the drive magnet is magnetized after the module mounting step;

wherein the lens drive module is assembled in the module assembling step by using the drive magnet, and the drive magnet is re-magnetized in the magnetizing step;

wherein, in the magnetizing step, the lens drive device, after the lens drive module and the circuit board have been integrated with each other in the module mounting step, is disposed at a portion where a magnetic field is formed in the optical axis direction by a coil for magnetizing;

wherein the lens drive device is disposed on an inner side of a tubular type air-core coil so that the direction of the magnetic field for magnetizing which is formed by the air-core coil is coincided with the magnetizing direction of the drive magnet which has been previously magnetized; and wherein a plurality of the lens drive devices is simultaneously magnetized in the magnetizing step.

2. The manufacturing method for a lens drive device according to claim 1, wherein the drive mechanism is provided with a plurality of the drive magnets whose one end faces are magnetized in same magnetic pole, and the plurality of the drive magnets are simultaneously magnetized in the magnetizing step.

* * * * *